(12) United States Patent
Traver et al.

(10) Patent No.: US 9,636,785 B2
(45) Date of Patent: May 2, 2017

(54) POSITIVE LOCKING HANDLE AND SELF CENTERING MECHANISM FOR TRACK ENGAGEMENT

(71) Applicant: LINCOLN GLOBAL, INC., City of Industry, CA (US)

(72) Inventors: Richard Dean Traver, San Diego, CA (US); Jamil Snead, San Diego, CA (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 296 days.

(21) Appl. No.: 14/178,896

(22) Filed: Feb. 12, 2014

(65) Prior Publication Data

US 2015/0129573 A1    May 14, 2015

Related U.S. Application Data

(63) Continuation-in-part of application No. 29/472,389, filed on Nov. 12, 2013.

(Continued)

(51) Int. Cl.
*B23K 9/28*       (2006.01)
*A47J 36/02*     (2006.01)
(Continued)

(52) U.S. Cl.
CPC ........ *B23K 37/0211* (2013.01); *B23K 9/0286* (2013.01); *B23K 9/0956* (2013.01);
(Continued)

(58) Field of Classification Search
CPC ............ B23K 2201/06; B23K 37/0211; B23K 37/0217; B23K 37/0276; B23K 37/0282;
(Continued)

(56) References Cited

U.S. PATENT DOCUMENTS 1,114,793 A    10/1914   Murray
3,135,850 A *   6/1964   Scheiler ............... B23K 9/0286
                                                          219/60 A (Continued)

FOREIGN PATENT DOCUMENTS

DE    20 2004 018670 U1    3/2005
GB          898 197          6/1962
(Continued)

OTHER PUBLICATIONS

Helix T55 Weld Head and Track Ring Sheet; by Lincoln Electric, Publication E0.610, Issue Date Dec. 2012.

*Primary Examiner* — Dana Ross
*Assistant Examiner* — Ket D Dang
(74) *Attorney, Agent, or Firm* — Foley & Lardner LLP

(57) ABSTRACT

The invention described herein generally pertains to locking mechanisms for levers operable to mount a tractor unit to a guide track and to engage a drive gear of the tractor unit to a track gear of the guide track. The levers for mounting the tractor unit and/or to engage the drive gear are lockable in a closed position. The closed position relates to a state of the levers when the tractor unit is mounted on the guide track or when the drive gear is engaged with the track gear. The levers can be easily operable to mount/dismount or engage/disengage, respectively.

20 Claims, 16 Drawing Sheets

Related U.S. Application Data

(60) Provisional application No. 61/903,016, filed on Nov. 12, 2013, provisional application No. 61/907,630, filed on Nov. 22, 2013.

(51) Int. Cl.
| | | |
|---|---|---|
| *B23K 37/02* | (2006.01) | |
| *B23K 9/028* | (2006.01) | |
| *B23K 9/095* | (2006.01) | |
| *B23K 9/12* | (2006.01) | |
| *B23K 101/06* | (2006.01) | |

(52) U.S. Cl.
CPC ............ *B23K 9/12* (2013.01); *B23K 37/0217* (2013.01); *B23K 37/0276* (2013.01); *B23K 37/0282* (2013.01); *B23K 37/0294* (2013.01); *B23K 2201/06* (2013.01)

(58) Field of Classification Search
CPC B23K 37/0294; B23K 9/0286; B23K 9/0956; B23K 9/12
USPC .............. 228/101, 44.5, 49.3, 212, 102, 12; 266/56, 76, 48; 105/29 R, 144; 219/60 R, 61, 124.33, 124.34, 125.12, 219/137.31, 137.62, 138
See application file for complete search history.

(56) References Cited

U.S. PATENT DOCUMENTS

| | | | | |
|---|---|---|---|---|
| 3,604,612 | A | | 9/1971 | Miller et al. |
| 3,852,943 | A | | 12/1974 | Healy |
| 3,873,798 | A | * | 3/1975 | Friedman ............. B23K 9/0286 219/125.11 |
| 3,925,854 | A | * | 12/1975 | McFadden ......... B23K 37/0533 219/161 |
| 4,153,142 | A | * | 5/1979 | Spisz ....................... B41J 11/32 188/67 |
| 4,282,771 | A | | 8/1981 | Grube |
| 4,422,384 | A | | 12/1983 | Johnson et al. |
| 4,515,533 | A | * | 5/1985 | Gomez ................... F16D 23/12 192/114 R |
| 4,841,123 | A | | 6/1989 | Novak et al. |
| 4,936,239 | A | * | 6/1990 | Awalt, Jr. ................ B63B 21/18 114/199 |
| 6,382,496 | B1 | * | 5/2002 | Harger ................... B23K 23/00 228/234.3 |
| 6,983,525 | B2 | * | 1/2006 | Moreno ................. B23Q 3/186 228/49.1 |
| 7,566,038 | B2 | | 7/2009 | Scott et al. |
| 8,096,921 | B2 | | 1/2012 | Hahn |
| 8,307,955 | B2 | | 11/2012 | Sommerfeld et al. |
| 8,393,059 | B2 | | 3/2013 | Dunn |
| 8,539,864 | B1 | * | 9/2013 | Kennedy ............... B25B 13/461 81/177.8 |
| 2003/0047585 | A1 | * | 3/2003 | McCombe ........... B23K 9/0286 228/49.1 |
| 2006/0071055 | A1 | * | 4/2006 | Carlson ................ B23K 9/0282 228/212 |
| 2011/0001022 | A1 | | 1/2011 | Edinger |
| 2013/0125685 | A1 | | 5/2013 | Miller et al. |
| 2013/0126494 | A1 | | 5/2013 | Miller et al. |
| 2013/0126496 | A1 | * | 5/2013 | Miller ..................... F16H 35/00 219/124.34 |

FOREIGN PATENT DOCUMENTS

| | | |
|---|---|---|
| GB | 1 428 120 | 3/1976 |
| GB | 1 534 773 | 12/1978 |

\* cited by examiner

POSITIVE LOCKING HANDLE AND SELF CENTERING MECHANISM FOR TRACK ENGAGEMENT

CROSS-REFERENCE TO RELATED APPLICATIONS AND INCORPORATION BY REFERENCE

This U.S. Patent Application claims the benefit of U.S. Provisional Patent Application No. 61/903,016, filed on Nov. 12, 2013; U.S. Design patent application No. 29/472,389, filed on Nov. 12, 2013; and U.S. Provisional Patent Application No. 61/907,630, filed on Nov. 22, 2013. The entireties of the above-mentioned applications are herein incorporated by reference.

TECHNICAL FIELD

In general, the present invention relates to an orbital welding system or a non-orbital welding system. More particularly, the present invention relates to positive locking handles for mounting a tractor unit on a guide track and engaging a tractor drive to a track gear, and/or a self-centering mechanism for mounting the tractor unit on the guide track.

BACKGROUND OF THE INVENTION

Welding systems reside at the core of the modern industrial age. From massive automobile assembly operations to automated manufacturing environments, these systems facilitate joining in ever more complicated manufacturing operations. Hot wire welding processes a wire or electrode being heated (e.g., via current) and received by a puddle created by a main heat source (e.g., plasma arc, tungsten inert gas (TIG) welding, metal inert gas (MIG) welding, flux core, among others). The hot wire welding process includes the resistance heating of the up to or near a melting point of such wire. In hot wire welding processes, the formation of an arc is avoided since an arc condition disrupts or overheats the puddle. A wire heated near or close to the melting point of the wire without arcing events is received by the puddle with little or no disruption. In order to prevent a formation of an arc, a welding parameter related to the workpiece can be detected. The welding parameter can indicate an arc condition in which the hot wire welding process can be adjusted.

Additionally, welding may involve, raising, cladding, building up, filling, hard facing, overlaying, joining, and other welding applications. When confronted with a workpiece having a curved surface, an orbital welding processes may be used to rotate the welding head to apply a weld to the curved surface. The most common examples, where orbital welding is used, is the welding of pipe. Pipe welding may include thin wall application where the welding head is rotated about the other surface two piece ends being joined together, alternatively, pipe welding may include deep groove geometries where the welding electrode extends into a grove formed between the two pipes being joined to lay down successive beads of weld material to fill the grove the join the thick walled pipes. Orbital welding systems may include a welding head that is mounted on a guide track or a fixture that clamps or is otherwise supported on the workpiece and rotated to supply a weld. With orbital welding often involves limited visibility of a welding zone with lead cameras and/or trailing cameras.

Accordingly, in conventional orbital welding systems or other track-guided welding systems, the quality of a weld can be affected by the manner in which a tractor unit is mounted onto a guide track because the mounting can affect how smoothly the tractor unit will travel along the guide track. For example, an improperly mounted tractor unit on a track ring can flex as it moves around the track ring. The flexing can cause the tungsten electrode of the weld head that is attached to the tractor unit to move, e.g., the tungsten electrode can angle in when the tractor unit is at the "12 o'clock" position and angle out when it is at the "6 o'clock" position. This can occur when the tractor unit is not firmly mounted on the track, causing "crabbing" based on vibration or jerking. Additionally, mounting mechanisms can be fragile and easily damaged, e.g., binding and damage to tractor unit components can occur due to over-tightening.

In addition, improper alignment of the travel drive gear in the tractor unit to the track gear of the guide track can also cause problems with weld quality and delays in the welding process. For example, if the center of gravity of the weld head shifts due to, e.g., debris on the track gear, the gears on the travel drive gear and track gear can jam, especially if the system was not properly aligned. To reduce the problems associated with misalignment of the travel drive gear to the track gear, the travel speed of conventional tractor units may need to be set to slow.

Further, engagement of the travel drive gear in the tractor unit to the track gear of the guide track is often performed with a cam lever or other such quick-release mechanism. Should the cam lever fail or open while the tractor unit is in operation, the tractor unit becomes freely movable on the guide track. The tractor unit can, therefore, rapidly move to a position of minimum gravitational potential resulting in poor weld quality and possibly injury. For instance, the guide track can vertically oriented such that the tractor unit drives upward. The tractor unit would freely slide down the guide track in the event of accidental disengagement of the travel drive gear.

SUMMARY OF THE INVENTION

In accordance with an embodiment of the present invention, a tractor unit for a welding system is provided. The tractor unit can include a drive gear configured to engage a track gear on a guide track. A clutch mechanism is provided for selectively engaging the drive gear to the guide track. The clutch mechanism includes a clutch lever operable between a first position and second position respectively corresponding to a first state in which the drive gear is engaged to the track gear and a second state in which the drive gear is disengaged from the track gear. The tractor unit can further include one or more rolling devices configured to freely move on one or more rails of the guide track, and a mounting mechanism for selectively clamping the one or more rolling devices to the one or more rails. The mounting mechanism includes a clamp lever operable between a first position and a second position respectively corresponding to a first state in which the one or more rolling devices are clamped and a second state in which the one or more rolling devices are unclamped. In addition, the tractor unit includes a locking mechanism coupled to at least one of the clutch lever or the clamp lever. The locking mechanism secures the at least one of the clutch lever or the clamp lever in respective first positions to prevent operation to respective second states.

In accordance with another embodiment of the present invention, a tractor unit is provided. The tractor unit can include a drive gear configured to engage a track gear on a guide track, a clutch mechanism for selectively engaging the drive gear to the guide track, and a mounting mechanism for selectively clamping the tractor unit to one or more rails of the guide track. In addition, the tractor unit can include a cam handle coupled to one of the clutch mechanism or the mounting mechanism and operable between a first position and a second position. The first position is a closed position which engages the drive gear to the track gear or clamps the tractor unit to the one or more rails of the guide track. The second position is an open position which disengages the drive gear or unclamps the tractor unit. The cam handle can include a cam portion configured to rotate about an axis, a lever extending radially from the cam portion, and a leg portion extending transverse to the lever and configured to stop a rotation of the cam handle during transition to the first position.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
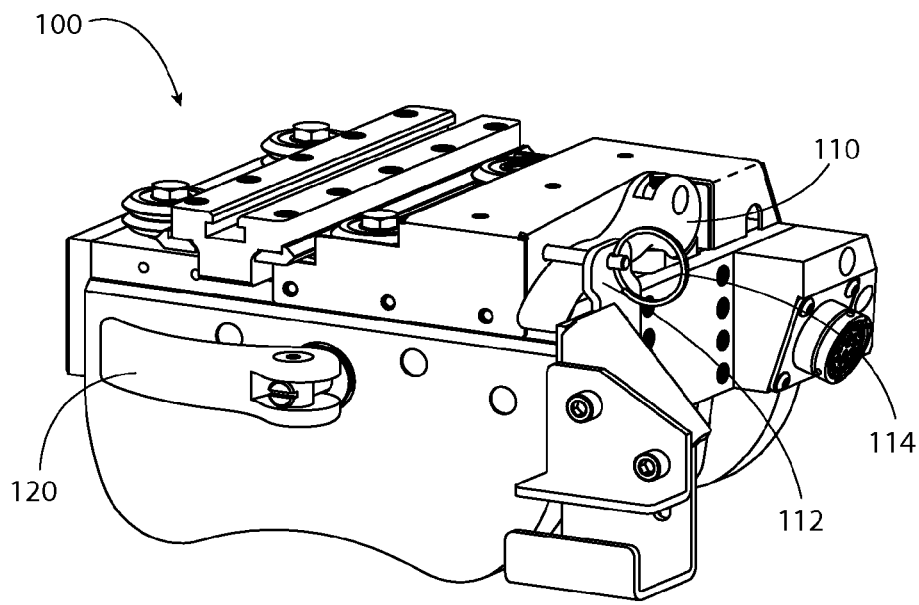
FIG. 1 illustrates a perspective view of a tractor unit configured to mount to a guide track with a mounting mechanism in a closed and locked position.

Exemplary embodiments of the invention generally relate to locking mechanisms for levers operable to mount a tractor unit to a guide track and to engage a drive gear of the tractor unit to a track gear of the guide track. As utilized herein, the tractor unit is employable in welding systems, particularly orbital welding systems, where a welding head, supported by the tractor unit, is connected to a track along which the welding head travels to perform a weld. In specific examples, the levers for mounting the tractor unit and/or to engage the drive gear are lockable in a closed position. As described herein, the closed position relates to a state of the levers when the tractor unit is mounted on the guide track or when the drive gear is engaged with the track gear. The levers can be designed to be easily operable to mount/dismount or engage/disengage, respectively. Accordingly, the locking mechanisms disclosed herein prevent accidental opening of the levers during operation.

Other exemplary embodiments relate to a self-centering mechanism for mounting the tractor unit to the guide track. Specifically, a mounting assembly of the tractor unit is configured to engage and/or disengage the guide track through the operation of a handle. In an example, the handle can be a cam lever that operates to engage the tractor unit to the guide track when in a closed position and to release the guide track when in an open position. The handle is configured to prevent an over-tightening or over-tensioning of the mounting assembly to the guide track. In addition, the handle includes adjustable members to enable the handle to close to a pre-determined amount for proper mounting to the guide track.

Embodiments of the invention relate to methods and systems that relate to adjusting an arc current for a welding operation or a height of a torch that performs the welding operation. In particular, a parameter can be updated based upon, for instance, a user input, and the arc current or the height of the torch can be calibrated to perform the welding operation. Specifically, while a parameter is being adjusted or transitioned to the setting received via user input, the height of the torch and/or the arc current level is maintained until the setting is achieved for the parameter. Once the parameter is at the setting, a second arc current level or second height for the torch is implemented to perform the welding operation. By maintaining the current level and height until the transition is completed, a recalibration allows the welding operation to be within desired tolerances without manual adjustment of multiple parameters.

"Welding" or "weld" as used herein including any other formatives of these words will refer to depositing of molten material through the operation of an electric arc including but not limited to submerged arc, GTAW, GMAW, MAG, MIG, TIG welding, or any electric arc used with a welding system, an orbital welding system, or non-orbital welding system.

Exemplary embodiments will now be described with reference to the drawings. The examples and drawings are illustrative only and not meant to limit the invention, which is measured by the scope and spirit of the claims. Like reference numerals refer to like elements throughout.

FIG. 1 illustrates a tractor unit 100 that can be movably mounted to a guide track (not shown) using a rolling device or rolling devices such, for example, wheels and/or rollers. According to one example, the tractor unit 100 can be utilized for orbital welding applications whereby the tractor unit 100 travels on the guide track around pipes or tubes to be welded together. Accordingly, tractor unit 100 is operable to support a welding torch (such as a tungsten inert gas (TIG), metal inert gas (MIG) or gas tungsten arc welding (GTAW) torches), connectable to a weld power source, a controller, and/or a pendant providing operator control.

An exemplary guide track, on which tractor unit 100 is mountable, can include two track rails having circular exterior surfaces (i.e., tubular rails). The two track rails are positioned on the outside of the guide track, which, for orbital welding applications, can be shaped a ring guide track and mounted to a cylindrical work piece such as a pipe. However, the track guide is not limited to being an annulus and it is to be appreciated that the guide track can be a semi-circular track, straight or linear track, or a curved or other non-linear track. Moreover, the tractor unit 100 is not limited to be mounted on an outside, i.e., a convex side, of a guide track and can be mounted on a concave guide track or a variable guide track having both concave and convex portions.

As described above, an exemplary guide track includes tubular track rails featuring rounded geometry to provide multiple points of contact to a mounting component of the tractor unit 100 and a track trail of the guide track. According to an example, the mounting component can include rollers or wheels (that interface with the tubular track rail at multiple points of contact (or a contact line). Specifically, two multi point rollers can be paired for contacting the track rail and for rolling against the curved surfaces of the track rail. For instance, the multi point rollers can be connected to a pivot block and can rotate around their respective roller rotation axis when rolling along the track rail.

As shown in FIG. 1, the tractor unit 100 includes a clutch lever 110 and a clamp lever 120. The clutch lever 110 is configured to operate a clutch mechanism or drive gear engagement mechanisms that, among other things, easily engages and disengages a drive gear of the tractor unit 100 to a track gear of the guide track. The clamp lever 120 operates a mounting mechanism of the tractor unit 100 that clamps and unclamps the tractor unit 100, specifically the wheels or rollers of the tractor unit 100, to the guide track.

A variety of clutch mechanisms can be employed in accordance with the subject disclosure provided that such clutch mechanisms are operable via the clutch lever 110, which can be a cam handle. According to an exemplary clutch mechanism, when the clutch lever 110 is rotated to first position, as shown in FIG. 1 and also referred to as a closed position, the drive gear of the tractor unit 100 engages the track gear. When the clutch lever 110 is rotated to a second position, shown in FIG. 3 and also referred to as an open position, the drive gear disengages from the track gear. In an embodiment, a connecting member is provided that is connected to the drive gear on one end and, on the other end, is pivotably connected to a clutch arm, which by operation of the clutch lever 110 is movable between a first position and second position. In the first position, corresponding to the first position the clutch lever 110, the clutch arm pivots the connecting member such that the drive gear engages the track gear. In the second position of the clutch arm, corresponding to the second position of the clutch lever 110, the clutch arm pivots the connecting member such that the drive gear retracts from the track gear. However, the clutch lever 110 is not limited to being coupled to the drive gear by the above described mechanism and other linking mechanisms are contemplated that are capable of engaging/disengaging the drive gear when the clutch lever 110 is transitioned between the first position and the second position.

Similar to the clutch mechanism, a variety of mounting mechanisms can be utilized with aspects described herein provided that such mounting mechanisms are operable via the clamp lever 120, which can also be a cam handle. An exemplary mounting mechanism is described with reference to FIGS. 20-23. As illustrated in the bottom view of the tractor unit 100 of FIG. 20, the tractor unit 100 includes a track rail clamping assembly 1610, which is shown in an clamped or first position in FIG. 20.

Figure 20:
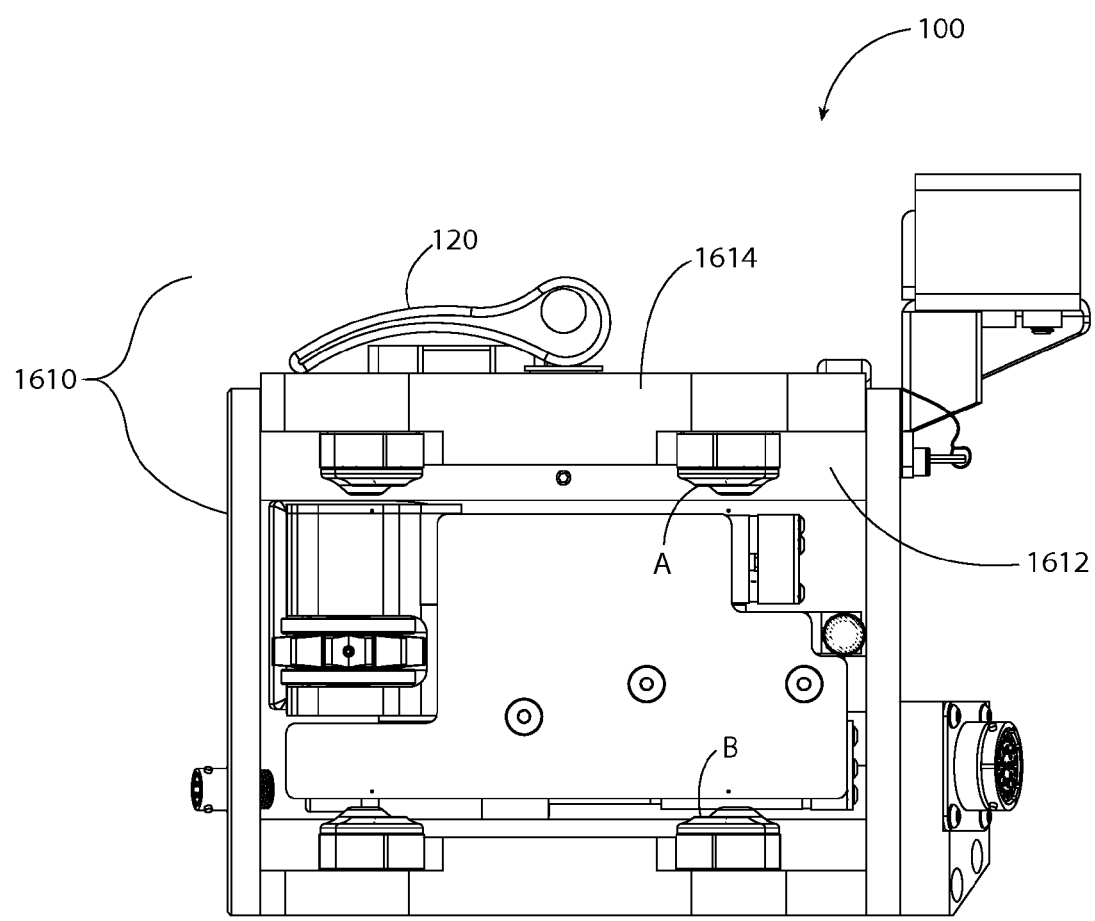
FIG. 20 is a bottom view of a latch mounting assembly of the tractor unit of FIG. 1 in a closed position.

As shown in FIG. 20, the tractor unit 100 has a fixed block 1612 and a movable plate 1614 that is operatively connected to wheel/roller set A. The tractor unit 100 can be movably mounted to a guide track using a rolling device or rolling devices such as, e.g., wheels and/or rollers. The rail clamping assembly 1610 can be a clamping mechanism 1610 that is operatively connected to the movable plate 1614. To mount or dismount the tractor unit 100, the clamping mechanism 1610 is moved between an open and closed position, thereby causing wheel/roller set A to retract, i.e. engage or disengage a tubular rail of the guide track. As part of the exemplary mounting mechanism, in some embodiments, the tractor unit 100 can be clamped or unclamped with the use of a single clamping action, i.e., by adjusting the clamping mechanism 1610 to move wheel/roller set A.

Figure 21:
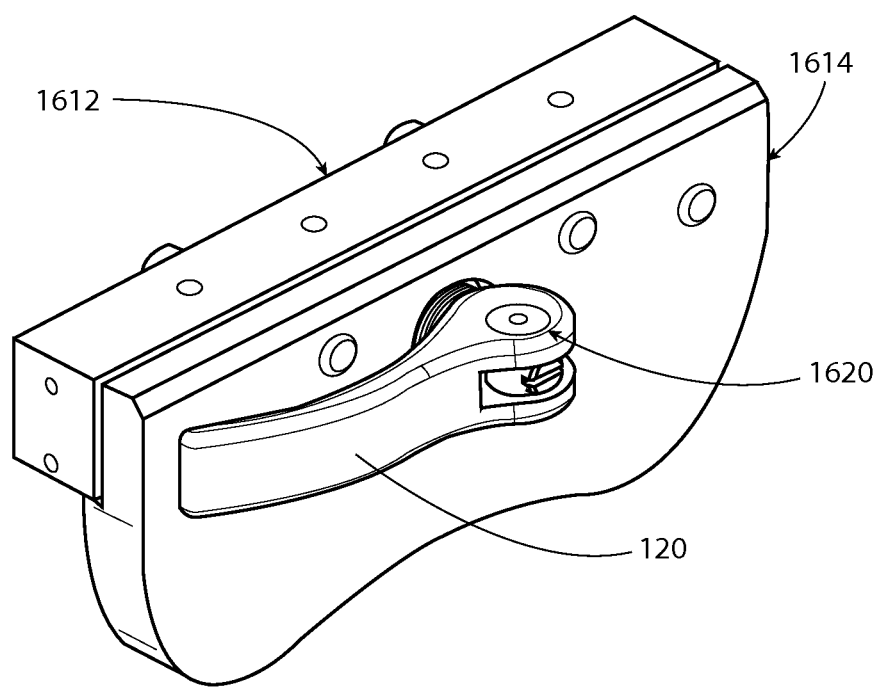
FIG. 21 is a perspective view of the latch mounting assembly in a closed position.
Figure 22:
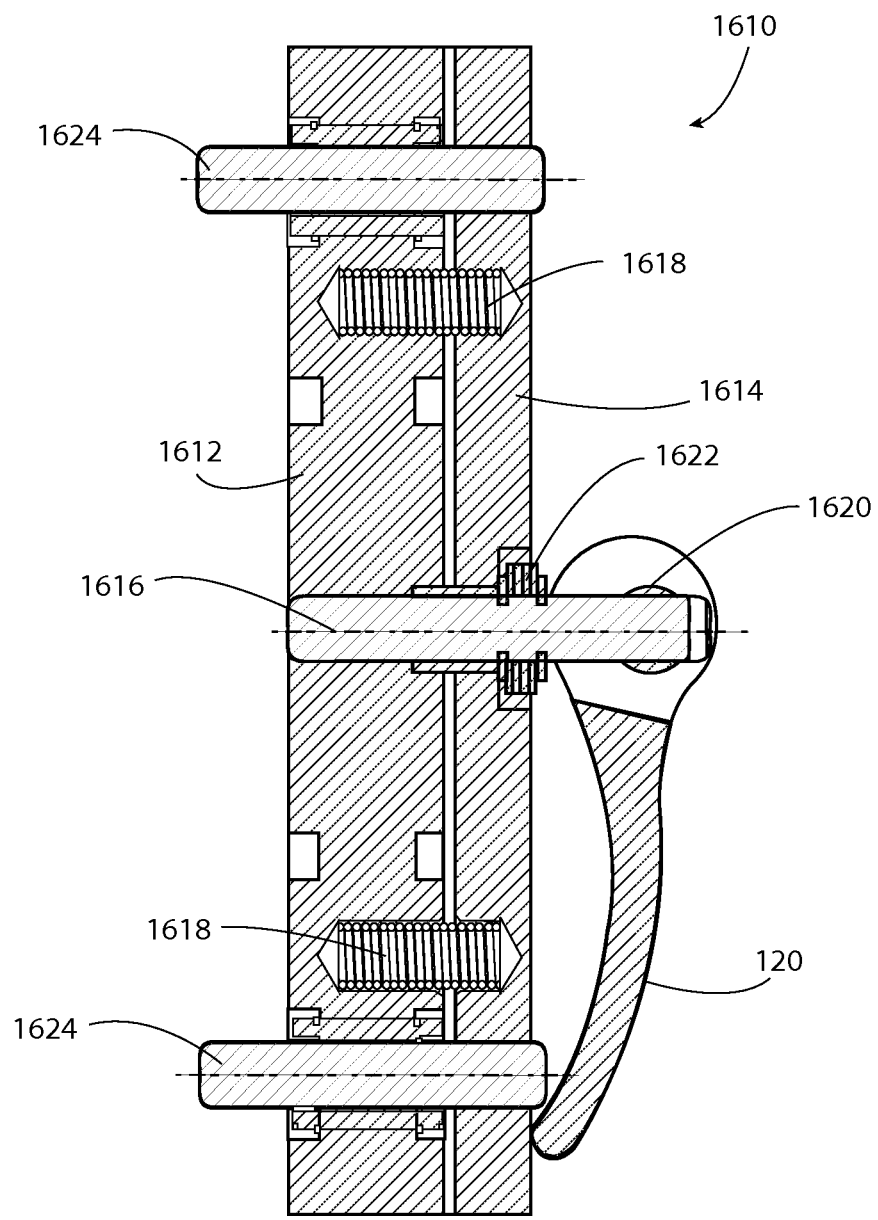
FIG. 22 is a top cutaway view of the latch mounting assembly in the closed position.
Figure 23:
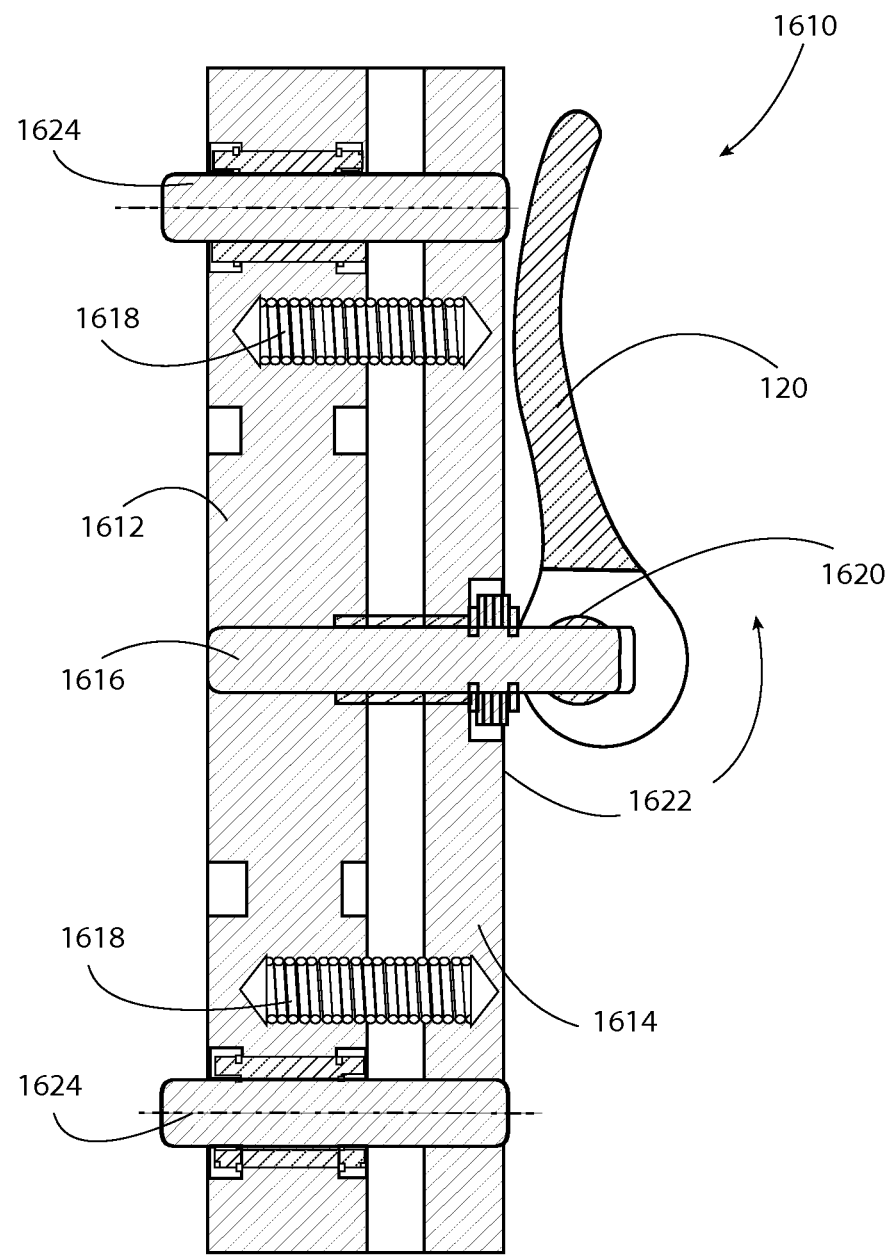
FIG. 23 is a top cutaway view of the latch mounting assembly in an open position.

Referring to FIGS. 21-23, the fixed block 1612 is fixed to the tractor unit 100 and the movable plate 1614 is movable relative to the fixed block 1612. The movable plate 1614 is connected to the fixed block 1612 by a threaded shaft 1616 and one or more cam springs 1618 that force the movable plate 1614 away from the block 1612. Use of the term "spring" herein will include any assembly capable of applying a biasing force including but not limited to linear springs, coil springs, pneumatic or hydraulic cylinders, inflatable bladders, resilient structures or materials, and the like. Therefore the particular embodiments shown in the drawings and described herein should not be considered limiting. Likewise, reference to a "spring" force or "spring" constant will be understood to include the biasing force, which may be constant or variable, and biasing constant, when constant, provided by a particular biasing assembly, component, or structure.

The shaft 1616 includes a first end threaded into the fixed block 1612 and a second end extending through the movable plate 1614 and having an axle 1620 passing therethrough. A cam handle, clamp lever 120, is attached to the axle 1620 and is movable between a first, open position (FIG. 23) and a second, closed position (FIG. 21, 22). As shown in FIGS. 22, 23, the cam handle 120 rotates approximately 180° about the axle 1620 between the open and closed positions, but it is to be appreciated that other angles of rotation are contemplated.

When the cam handle 120 is in an open position (FIG. 23), the cam portion allows the movable plate 1614 to sit farther away from the fixed block 1612 as the cam springs 1618 force the movable plate 1614 away from the fixed block 1612. In this position, the distance between the wheel/roller sets A, B (see FIG. 20) is maximized and the tractor unit 100 may be connected to or disconnected from the guide track. When the cam handle 120 is moved to a closed position (FIG. 22), the cam portion forces the movable plate 1614 towards the fixed block 1612. This causes the distance between the wheel/roller sets A, B to decrease, compressing the cam springs 1618 and thereby clamping the tractor unit 100 to the guide track.

An additional over-clamping spring 1622 may be provided between the cam handle 120 and the movable plate 1614 that prevents the cam portion from bottoming out and allows the cam handle 120 to completely close if the movable plate 1614 is flush to the fixed block 1612 or if the rollers have already made contact with the track before the cam portion has reached the closed position. The over-clamping spring 1622 typically has a very high spring force relative to the spring force of the cam springs 1618 so that the cam springs 1618 are compressed prior to the over-clamping spring 1622. The over-clamping spring 1622 will be provided with sufficient stiffness so that the tractor unit 100 still clings firmly to the track when the cam handle 120 is in the closed position. The over-clamp spring 1622 may also be useful in allowing the tractor unit 100 to be attached to the guide track having some variation in the track width. In this instance, the tractor unit 100 is placed on the narrowest track width and the cam handle 120 is closed. As the track widens, the over-clamp spring 1622 will compress, compensating for the difference in track width.

Linear bearing assemblies (consisting of a shaft and a linear bearing) 1624 may also be provided between the fixed block 1612 and movable plate 1614 to guide linear movement and reduce friction and wear during movement of the movable plate 1614 relative to the fixed block 1612. Adjustment of the distance between the fixed block 1612 and movable plate 1614 may be provided by adjusting the position of the threaded shaft 1616 and axle 1620 relative to the fixed block 1612. In a first adjustable embodiment, the threaded shaft 1616 may be threaded into the movable plate 1614 and have an adjustable threaded depth. In order to increase the distance between the fixed block 1612 and movable plate 1614 when the cam handle 120 is in a closed position, the shaft 1616 may be threaded into or removed from the fixed block 1612. By turning the shaft, the distance between the axle 1620 and fixed block 1612 may increase or decrease, fixing the distance between the wheels/rollers A, B in the closed position.

Figure 2:
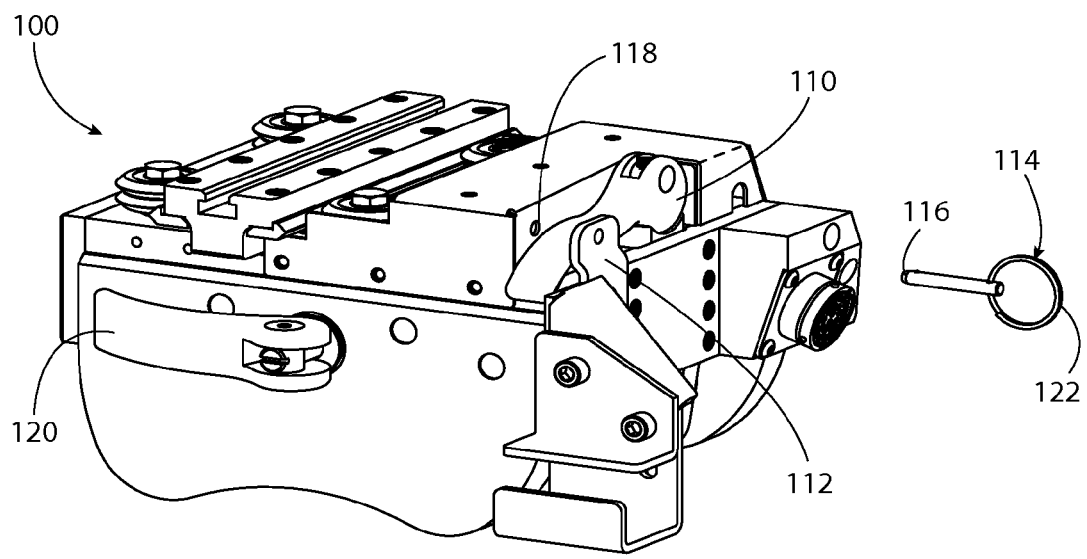
FIG. 2 illustrates a perspective view of the tractor unit of FIG. 1 with a lever unlocked.
Figure 3:
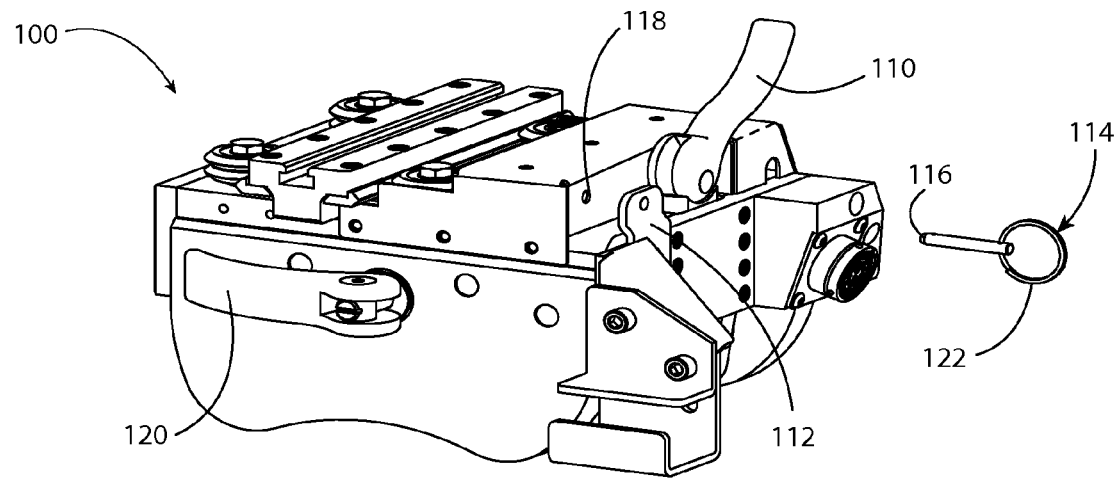
FIG. 3 illustrates a perspective view of the tractor unit of FIG. 2 with the lever in an open position.

From the above descriptions of exemplary clutch and mounting mechanisms operable by clutch lever 110 and clamp lever 120 respectively, it is to be appreciated that rapid and easy mounting and gear engagement is possible. However, during a weld operation facilitated by the tractor 100, secure closure of the levers is an important safety concern. As shown in FIGS. 1-3, an exemplary positive locking mechanism is depicted to secure the clutch lever 110 in a closed position and prevent disengagement of the drive gear without releasing the locking mechanism. While only the clutch lever 110 is shown associated with a positive locking mechanism, it is to be appreciated that the clamp lever 120 can also be paired with a similar lock. Indeed, this is particularly contemplated in order to prevent an entirety of the tractor unit 100 to accidentally detach completely from a guide track. For example, FIGS. 5-8, described below, illustrate positive locking of the clamp lever 120 in accordance with an exemplary embodiment.

Figure 4:
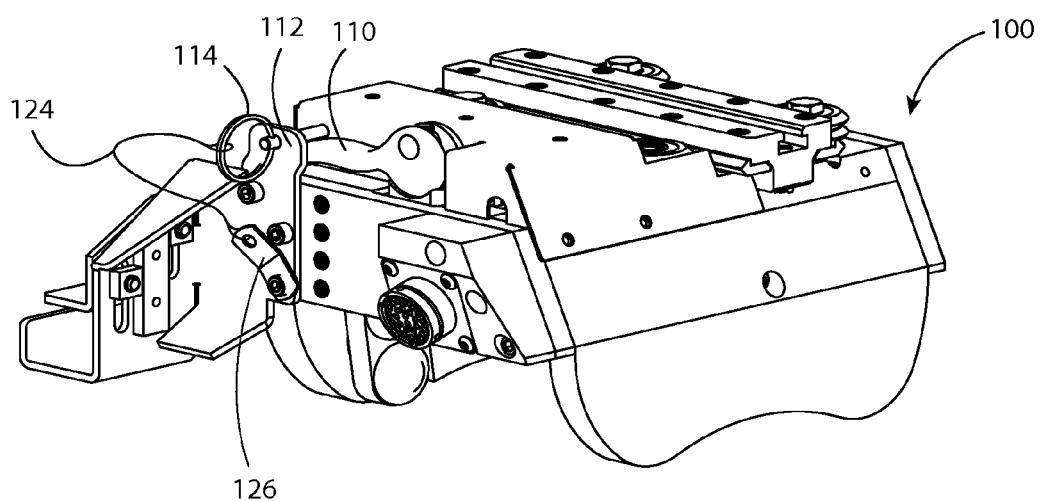
FIG. 4. Illustrates a perspective view of the tractor unit of FIG. 1 including a tethered locking pin in accordance with an additional aspect.

In an exemplary embodiment, the locking mechanism shown in FIGS. 1-3 includes locking tab 112 configured to accept a locking pin 114 and to guide the locking pin 114 over and across the clutch lever 110, in a closed position, to an aperture 118 opposing the locking tab 112 on the other side of clutch lever 110. As shown in FIGS. 2 and 3, the locking pin 114 can be a quick release having a ball detent 116. The ball detent 116 engages an interior surface surrounding the aperture 118 and does not release unless the pin is withdrawn via a ring portion 122. While the pin 114 is in place as shown in FIG. 1, the pin 114 operates to block the clutch lever 110 from opening. To disengage or open the clutch lever 110, the pin 114 is first removed to allow the clutch lever 110 to be freely released to an open position as shown in FIG. 3. To prevent the pin 114 from being misplaced or lost, the pin 114 can be tethered, via a lanyard 124 to a lanyard tab 126 secured to a housing of the tractor unit 100 by a bolt, for example, as shown in FIG. 4.

It is to be appreciated that pin 114 is not limited to quick-release pin as shown in FIG. 1 and can be a ball-lock pin (e.g., also commonly referred to as push-button, quick-release pin) such as pin 200 of FIGS. 5-8, a pin with a pawl to hold it in place, a clevis pin, a cotter pin, or substantially any other kind of pin that will stay secure in place. Further, it is to be appreciated that the pin 114 need not extend through a hole in the locking tab 112 and aperture 118 of the tractor unit 100. For instance, the pin 114 can engage only one of the locking tab 112 or aperture 118 and cantilever over the clutch lever 110. Moreover, the clutch lever 110 can include a through hole configured to accept the pin 114 to secure the clutch lever 110 in the closed position. The through hold can be through a side of the clutch lever 110 (i.e., in a direction the pin 114 is shown extending in FIG. 1) or through a top so that the pin 114 is received by a hole in the housing of the tractor unit 100 that is located underneath the clutch lever 110.

Figure 5:
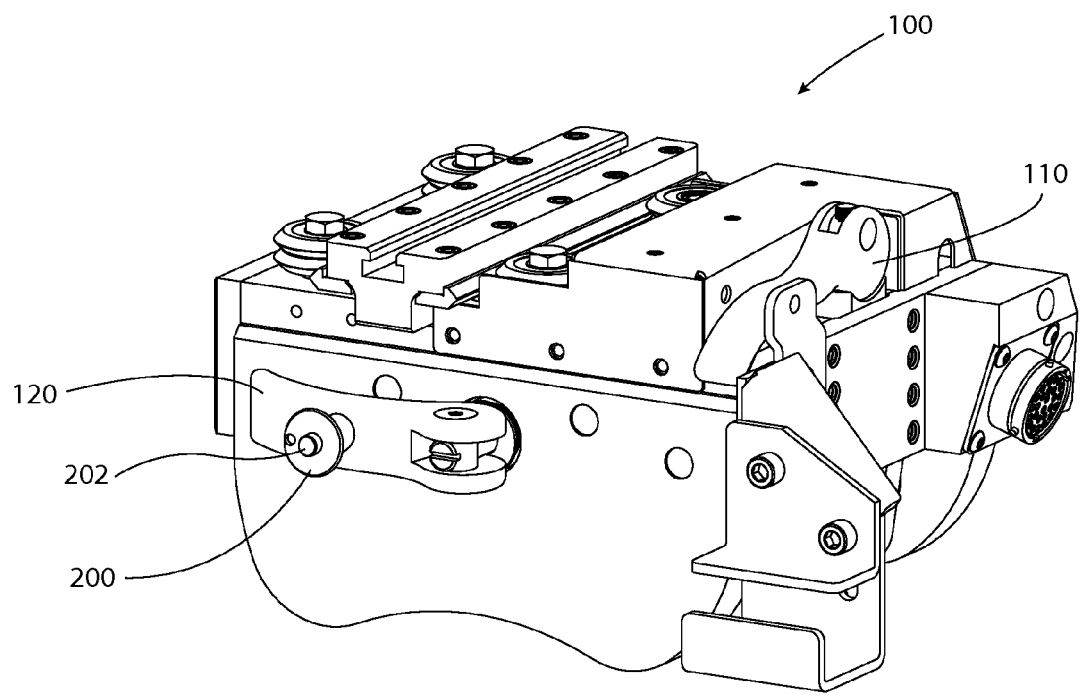
FIG. 5 illustrates a perspective view of a tractor unit configured to mount to a guide track with a mounting mechanism in a closed and locked position.
Figure 6:
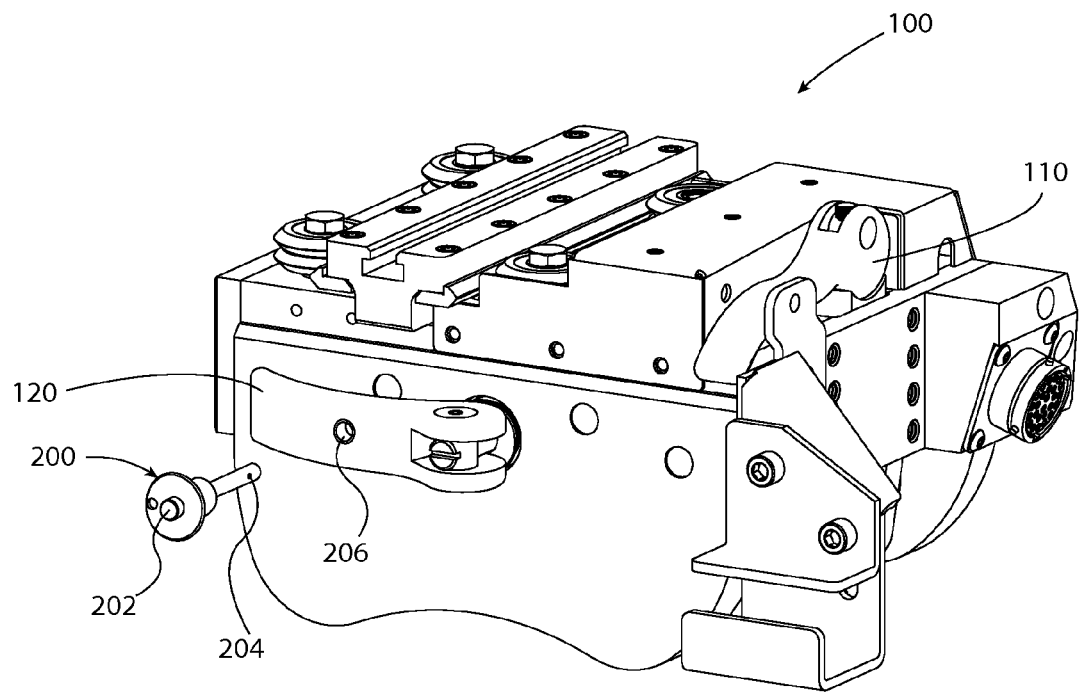
FIG. 6 illustrates a perspective view of the tractor unit of FIG. 5 with a locking pin removed.
Figure 7:
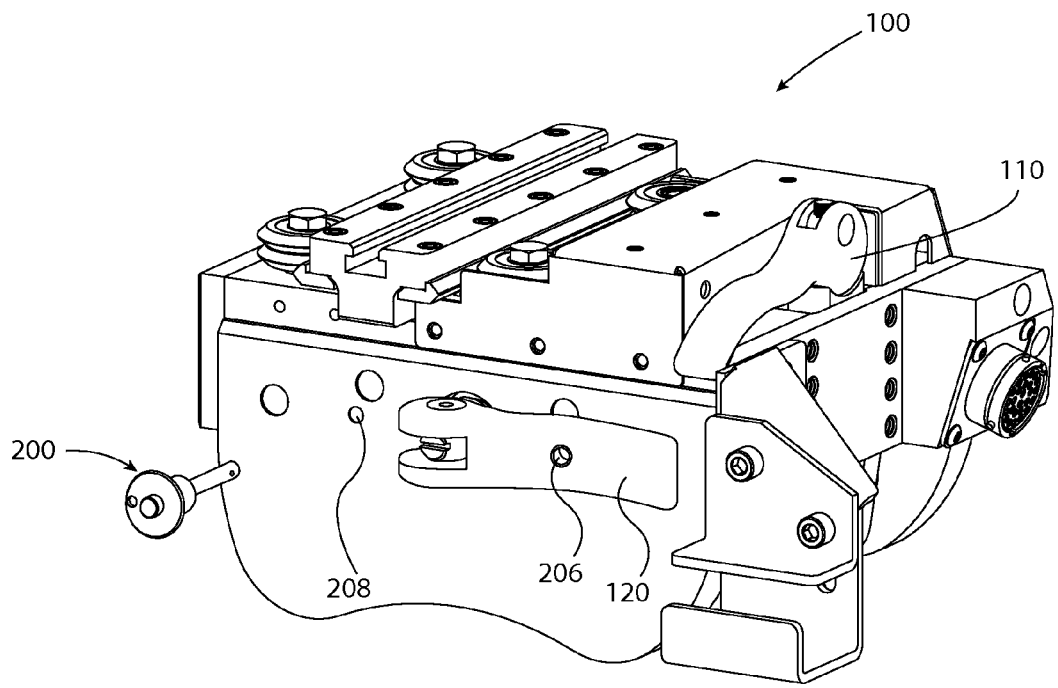
FIG. 7 illustrates a perspective view of the tractor unit of FIG. 5 with a lever in an open position.
Figure 8:
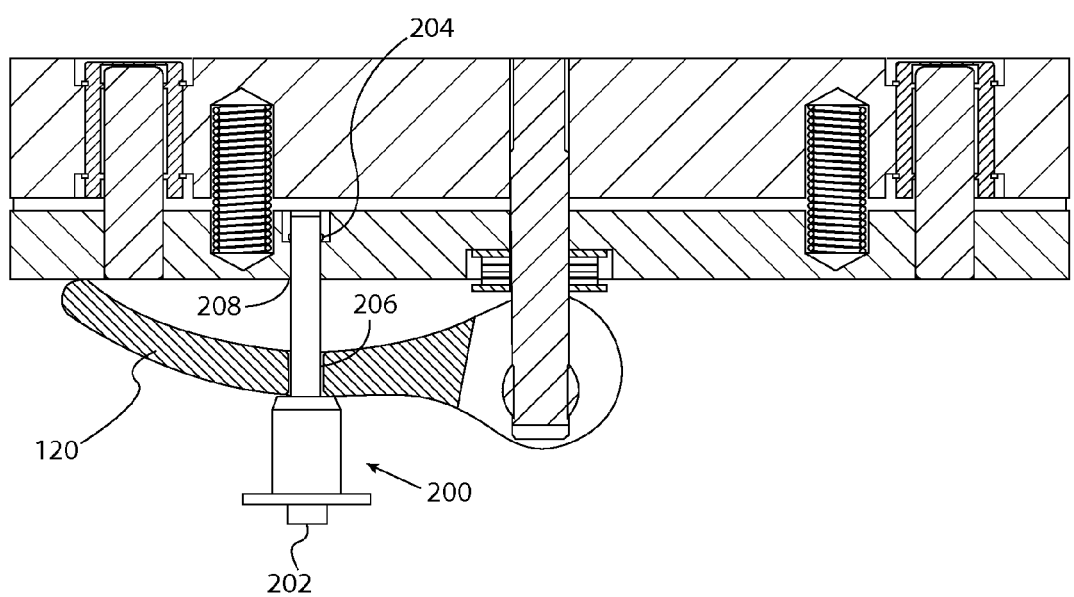
FIG. 8 illustrates a partial, cross-sectional view of the lever of FIG. 5 in the closed and locked position.

For example, turning to FIGS. 5-8, an exemplary embodiment that includes a positive lock device coupled with the clamp lever 120 is illustrated. As shown in FIG. 5, a pin 200 is shown restraining clamp lever 120 in a closed or engaged position (i.e., the first position), which corresponds to a state of the tractor unit 100 being clamped or mounted to a track. Pin 200 can be a ball-lock pin, which is also referred to as a push-button, quick-release pin. As shown in FIG. 6, pin 200 includes a push button 202 and a ball detent 204 which can be retracted into a shaft of pin 200 by depressing the push button 202. FIG. 6 further depicts an clamp lever aperture 206 extending through a handle portion of the clamp lever 202. The clamp lever aperture 206 is configured to accept pin 200 for locking. FIG. 7 illustrates the clamp lever 120 in an open or unengaged position (i.e., the second position), which corresponds to a state of the tractor unit 100 being unclamped or unmounted from a track. As shown, a second aperture 208 is provided in the housing of the tractor unit 100. The second aperture 208 operates to accept pin 200 inserted through the clamp lever aperture 206 of the clamp lever 120. To insert pin 200, push button 202 is depressed to retract the ball detent 204. Once retracted, pin 200 can be inserted through clamp lever aperture 206 and second aperture 208. After full insertion, the push button is released so as that the ball detent 204 extends from the shaft of pin 200 to engage with a surface within the second aperture to prevent removal of the pin 200. Thus, the clamp lever 120 becomes positively locked in the closed position as shown in FIG. 5. FIG. 8 illustrates a partial cross-sectional view of the clamp lever 120 restrained by pin 200 in the closed position.

As shown, the ball detect 204 engages a surface orthogonal to an axis of insertion of pin 200 to hold the pin and lock the clamp lever 120.

To operate the clamp lever 120—i.e., to move the clamp lever 120 to the open position—push button 202 is depressed to retract the ball detect 204 to allow the pin 200 to be drawn out of the second aperture 208 and the clamp lever aperture 206. Once pin 200 is removed (see FIG. 6), the clamp lever 120 can be manipulated to the open position as shown in FIG. 7.

Figure 9:
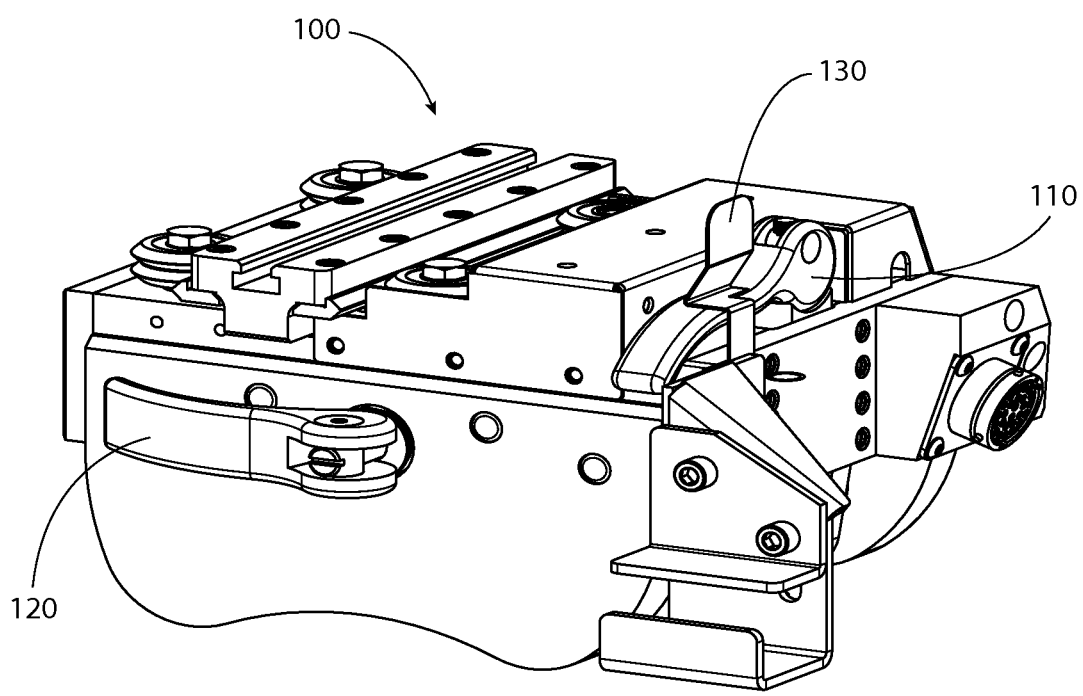
FIG. 9 illustrates a perspective view of a tractor unit configured to mount to a guide track and engage a track gear of the guide track in accordance with another aspect.

Further still, the locking mechanism is not limited to pin-type structures. For example, as shown in FIG. 9, a flexible locking clip 130 is provided to secure the clutch lever 110 in the closed position and prevent accidental disengaging. The locking clip 130 is a vertical piece of sheet metal or other material that extends vertically to a horizontal member. The horizontal member, when the clip 130 is locking the clutch lever 110, extends over the clutch lever 110. Angling upwards from the opposing end of the horizontal member from the vertical piece, is a angled deflection portion that is configured to cause deflection of the locking clip 130 in response to a downward force applied thereto. The downward force can be caused by a closing motion of the clutch lever 110 from an open position. The locking clip 130, during closing of the clutch lever 110, will deflect to allow the locking clip to slide past the horizontal member. Thereafter, the flexible locking clip 130 will spring back to an original position in which the horizontal member is positioned above the clutch lever 110, thus locking the clutch lever 110 in a closed position. To release the lock and, therefore, to open the clutch lever 110, the locking clip 130 is deflected by an operator to enable the clutch lever 110 to proceed past to the open position.

Moreover, it is to be appreciated that additional latching mechanisms are contemplated as well. For example, spring latches, drawbolt latches, hooks, pivotable restraint plates, case catches, or substantially any other clasping mechanism and/or restraint mechanism can be utilized to positively lock the clutch lever 110 and/or the clamp lever 120.

Figure 10:
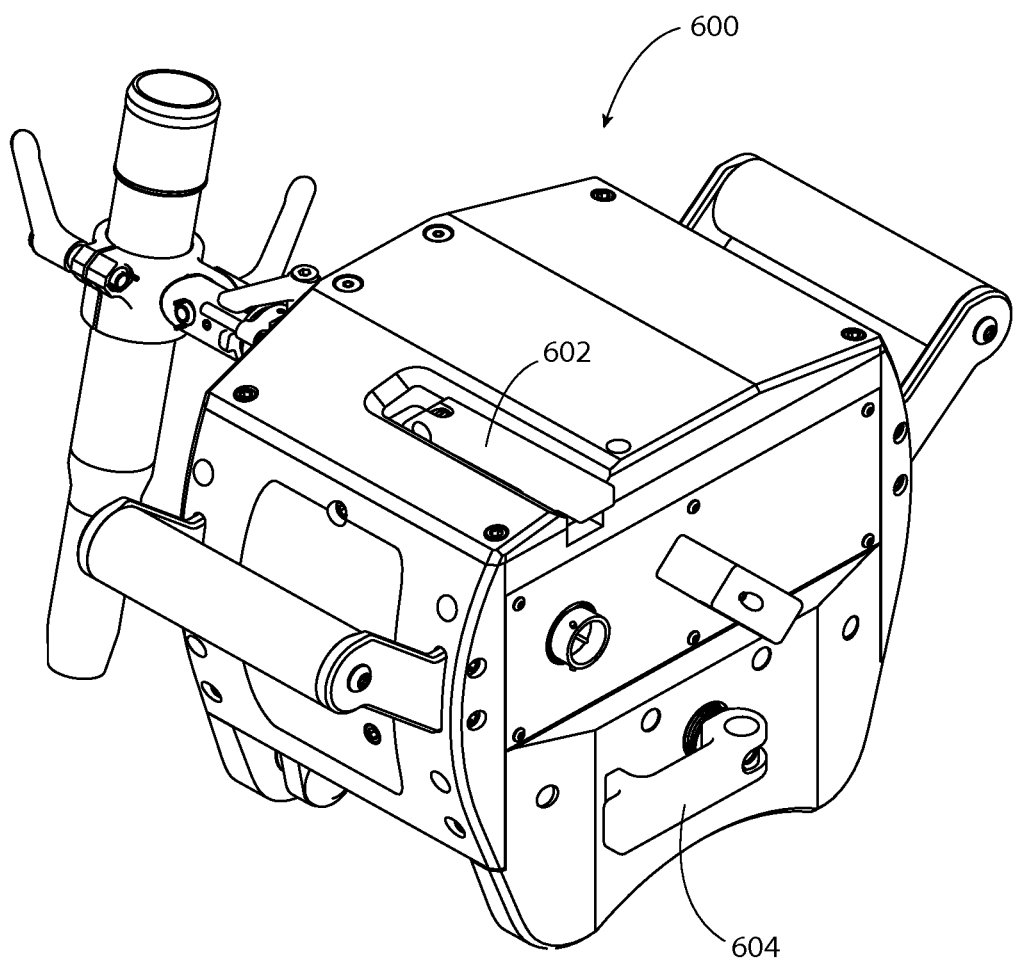
FIGS. 10 and 11 illustrate perspective views of a tractor unit having levers for quick engagement and/or disengagement with a guide track.
Figure 11:
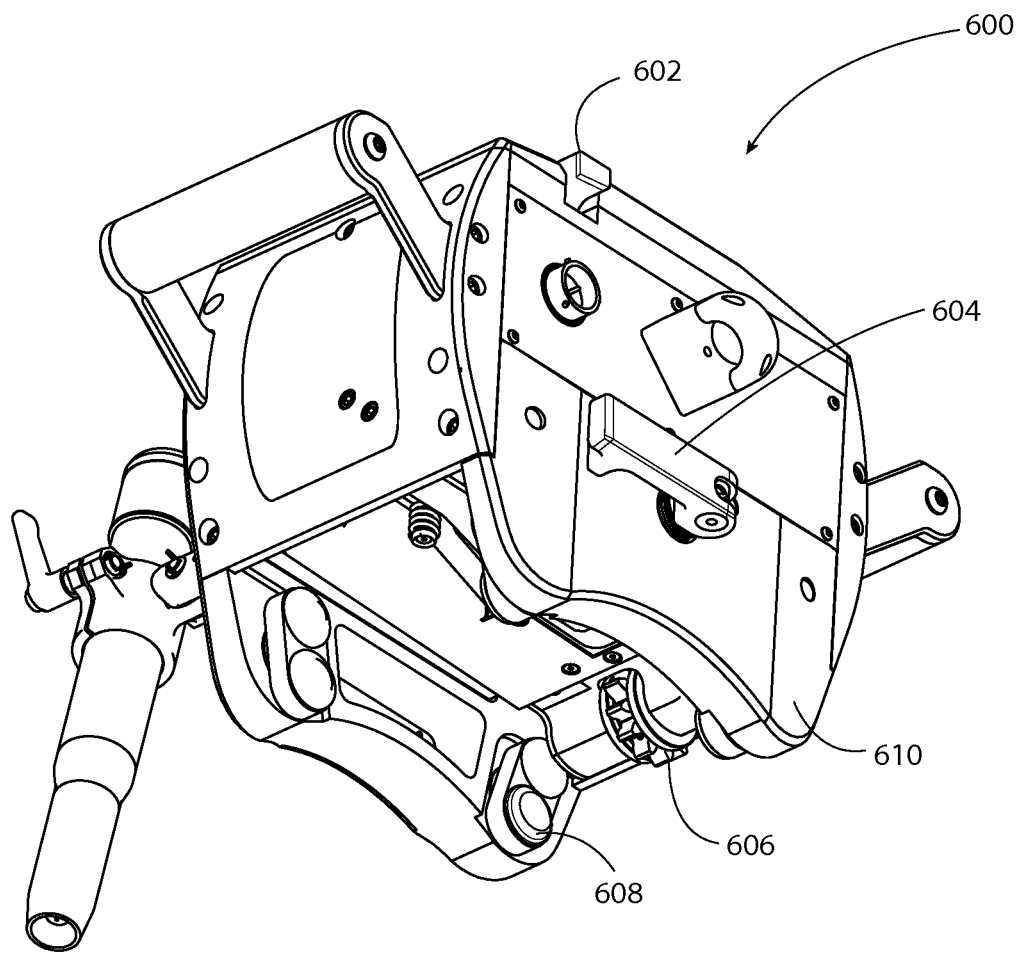

Turning to FIGS. 10 and 11, illustrated is an alternative tractor unit 600 having levers 602, 604 for quick engagement and/or disengagement with a guide track in accordance with one or more aspects. Similar to the tractor unit 100 above, tractor unit 600 includes a clutch lever 602 and a clamp lever 604. Further, operation of the levers 602 and 604 can be similar to the corresponding levers 110 and 120 of tractor unit 100 in that the levers 602 and 604 are configured to operate a clutch mechanism and a mounting mechanism, respectively. That is, clutch lever 602 operates to engage or disengage drive gear 606 from a track gear. Clamp lever 604 operates to reciprocate a movable plate 610 on which one set of wheels 608 is attached and, thereby, clamp or unclamp from track rails.

Figure 12:
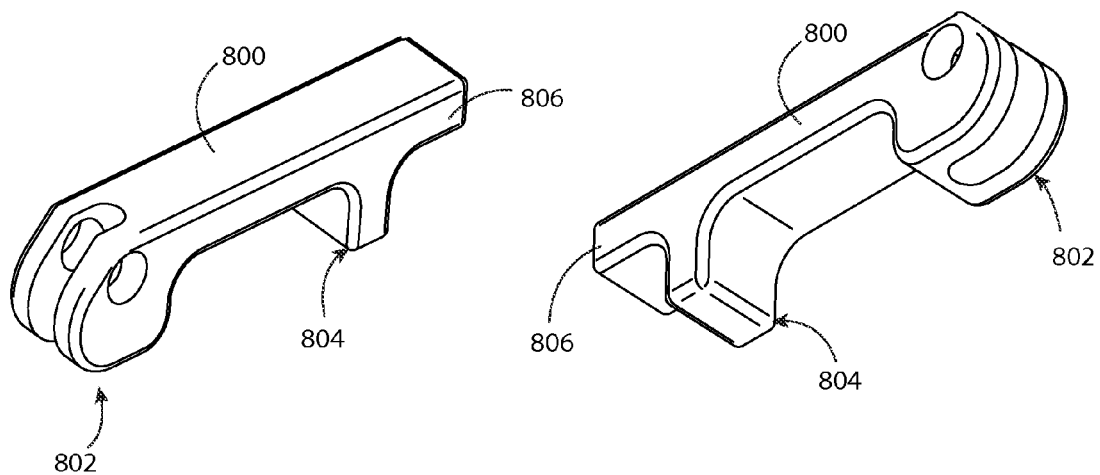
FIG. 12 illustrates perspective views of a clamp lever operable to engage the tractor unit of FIGS. 6 and 7 to a guide track and to prevent over-tightening to the guide track.
Figure 13:
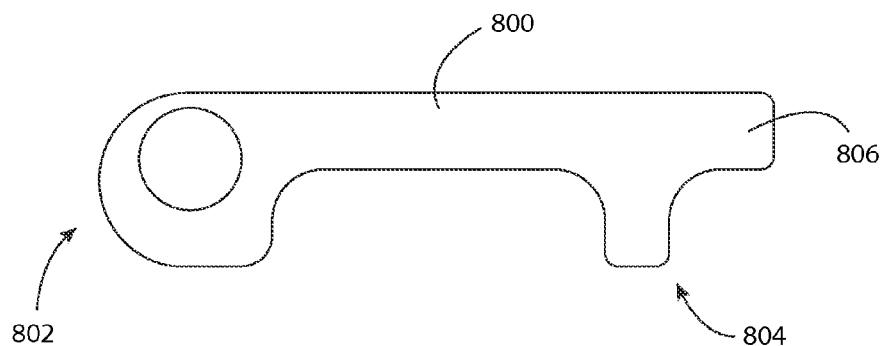
FIG. 13 illustrates a side view of the clamp lever of FIG. 12.

FIGS. 12 and 13 illustrate a cam lever 800 employable as either the clutch lever 602 or the clamp lever 604. The cam lever 800 includes a cam portion 802 eccentrically configured to provide a clamping force and to naturally progress to an open position or a closed position when rotated beyond a centerline. As shown in FIGS. 8 and 9, the cam lever 800 further includes a leg portion 804 that operates as a stop to prevent excessive clamping force from being applied by the cam lever 800 in a closed position. In addition, the leg portion 804 can be configured (i.e., constructed to be a predetermined length) such that, when operating a stop, the mounting mechanism is retracted by a correct amount for a proper mount on a guide track. Thus, by engaging such a cam lever 800 to the greatest closed position allowed by the leg portion 804, the tractor unit 600 self-centers on a guide track. Accordingly, the tractor unit 600 can be readily mounted and dismounted without extensive adjustments. The cam lever 800 can further include an overhanging portion relative to the leg portion 804, such as grip portion 806, configured to be easily grasped by an operator in order to open or disengage the cam lever 800.

Figure 14:
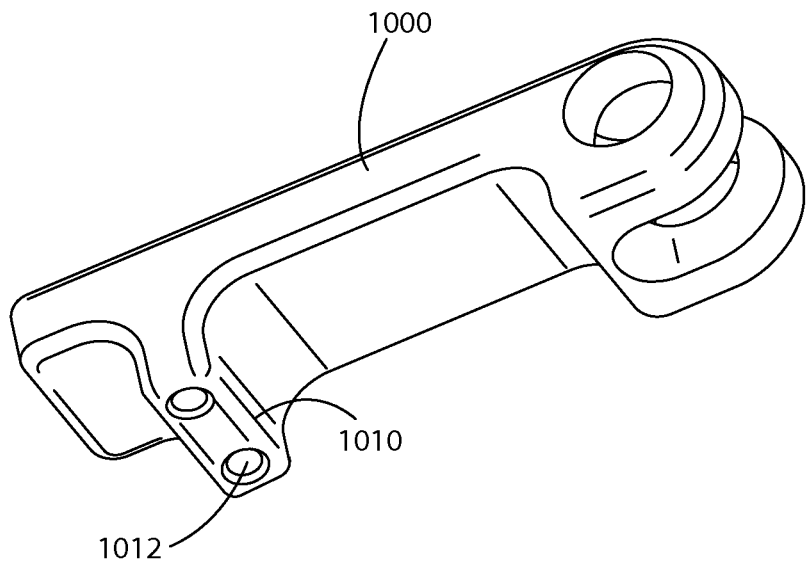
FIG. 14 illustrates a perspective view of a clamp lever with a self-centering mechanism to enable rapid alignment and mounting of the tractor unit to the guide track, according to alternative aspects.
Figure 15:
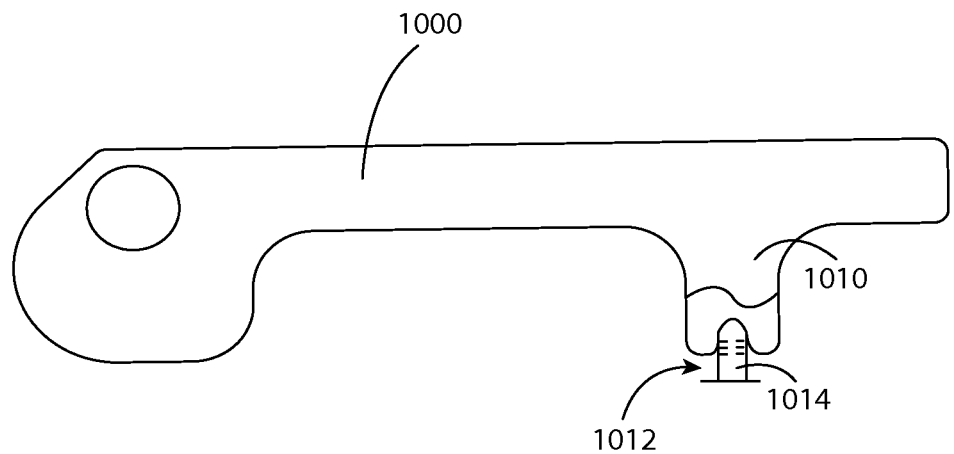
FIG. 15 illustrates a partial cutaway, side view of the clamp lever of FIG. 14.

FIGS. 14 and 15 illustrates a clamp lever 1000 with a self-centering mechanism to enable rapid alignment and mounting of the tractor unit to the guide track. Specifically, clamp lever 1000, which can be employable as clamp lever 604 of FIG. 10, includes a leg portion 1010 having one or more openings 1012 configured to accept screws 1014. By loosening and tightening the screws, the leg portion 1010 can be adjusted to provide different stop levels. Accordingly, the tractor unit 600 can be adjusted to differently sized guide tracks and then, once adjusted, can be mounted and dismounted quickly and accurately via the clamp lever 604.

Figure 16:
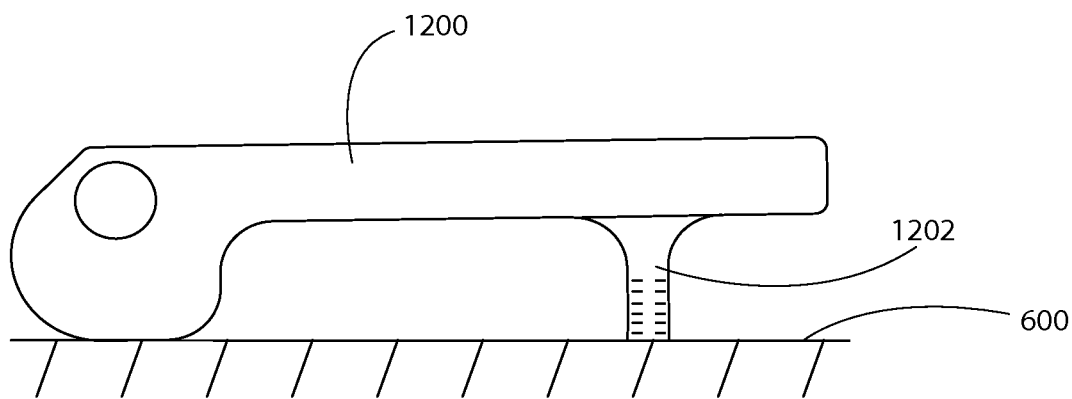
FIG. 16 illustrates a partial cutaway, side view of an alternative clamp lever according to one or more aspects.
Figure 17:
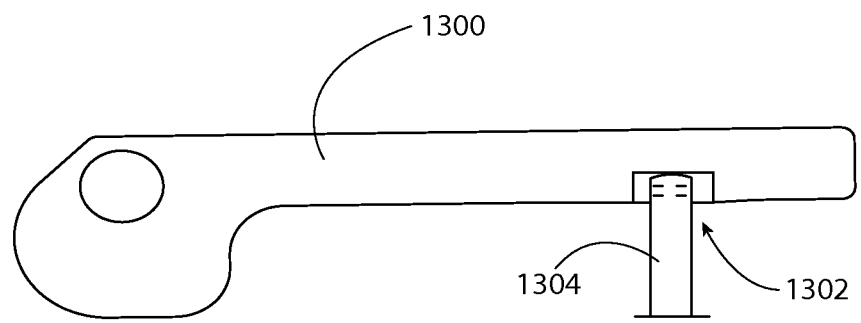
FIG. 17 illustrates a partial cutaway, side view of an alternative clamp lever according to one or more additional aspects.

FIG. 16 illustrates a clamp lever 1200 in accordance with one or more alternative aspects. An adjustment screw 1202 is received by a housing for tractor unit 600 as opposed to the clamp lever as with previous examples. Tightening or loosening the screw 1202 establishes a height at which the clamp lever 1200 is stopped when transitioned to the closed position. In FIG. 17, yet another exemplary embodiment of a clamp lever is illustrated. In this embodiment, a clamp lever 1300 does not include a leg portion to receive an adjustment screw 1304. Rather, an aperture 1302 is provided in an elongated portion of the clamp lever 1300 for receiving the adjustment screw 1304

Figure 18:
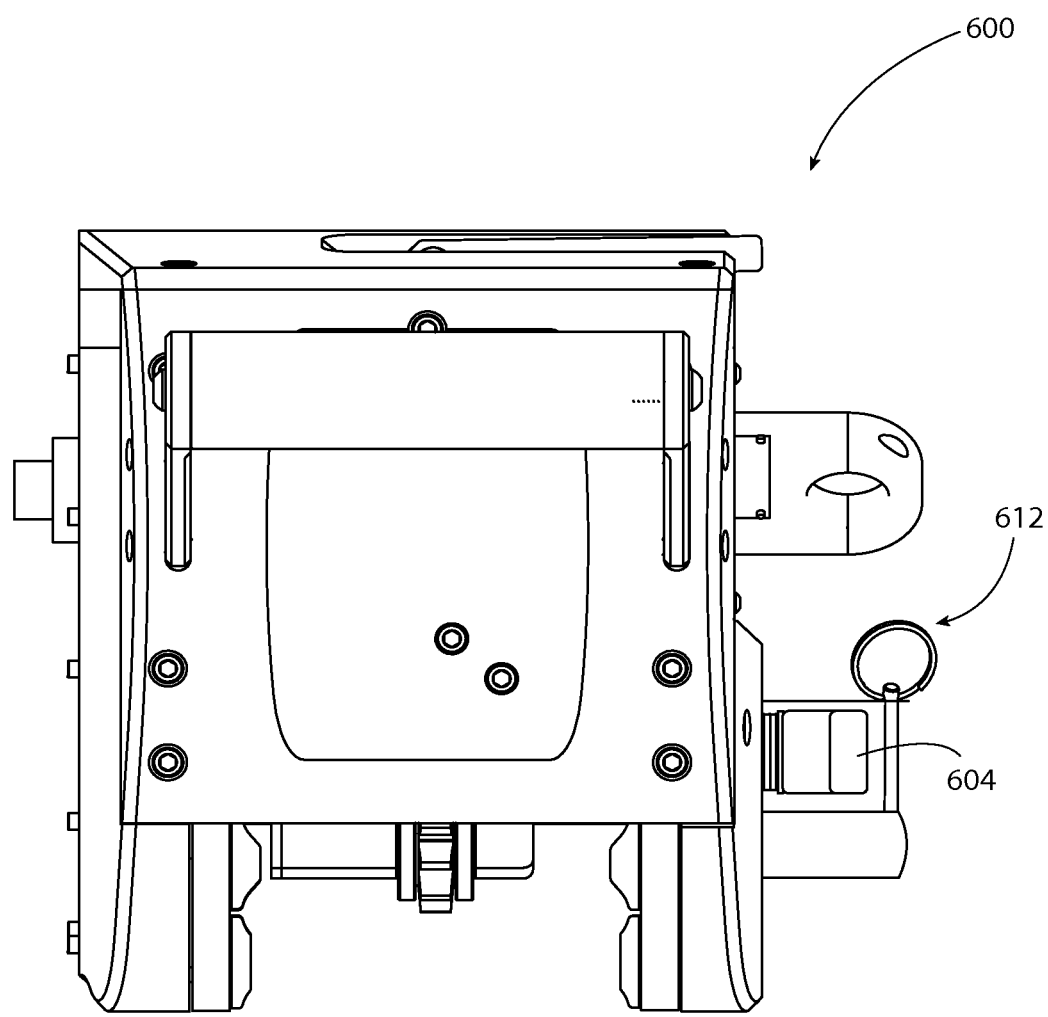
FIGS. 18 and 19 illustrates perspective views of a tractor unit of FIGS. 10 and 11 with positive locking of the levers in accordance with one or more alternative embodiments.
Figure 19:
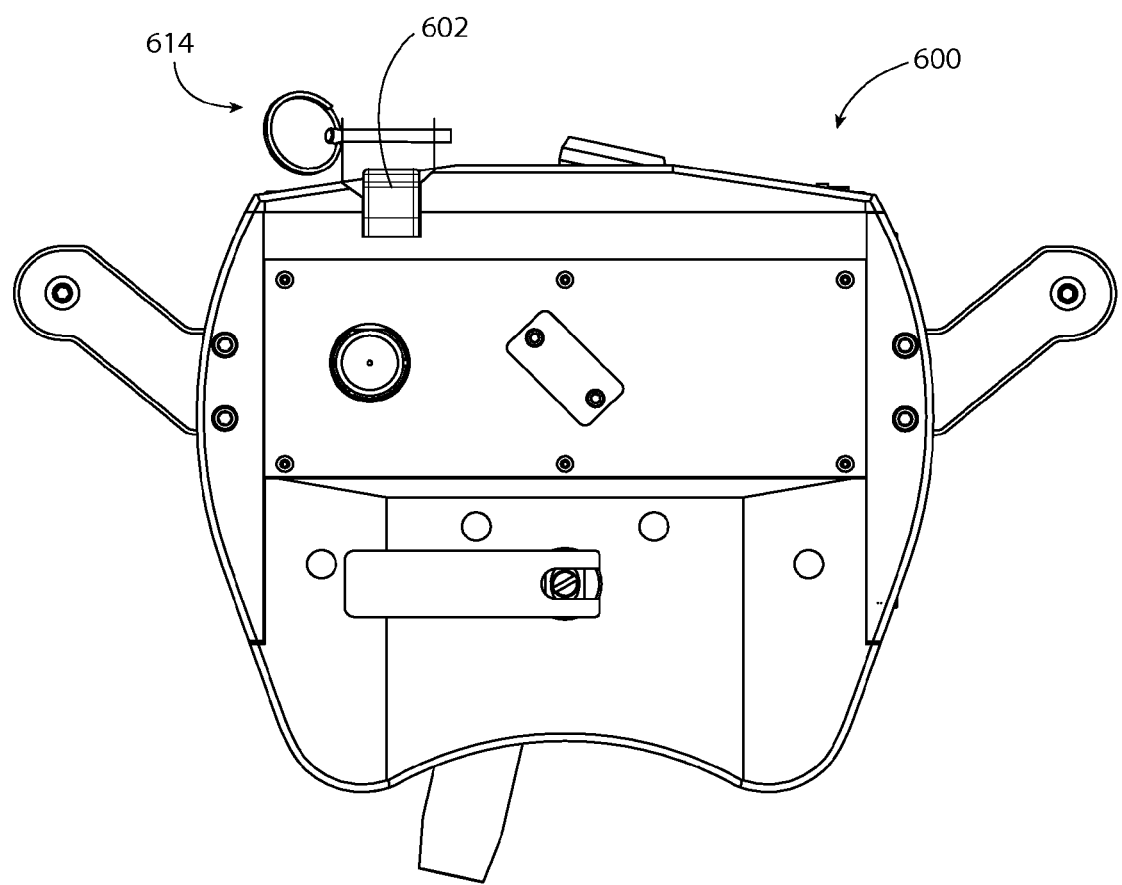

FIGS. 18 and 19 illustrates an exemplary embodiment in which the positive locking mechanisms from FIGS. 1-4 are employed with tractor unit 600 of FIGS. 10 and 11. In FIG. 18, a locking mechanism 612 is shown locking the clamp lever 604. In FIG. 19, a locking mechanism 614 is shown locking the clutch lever 602.

While the embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit of scope of the above discussed inventions. The embodiments and discussions herein can be readily incorporated into any of these systems and methodologies by those skilled in the art.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A tractor unit for a welding system, comprising:
a drive gear configured to engage a track gear on a guide track;
a clutch mechanism for selectively engaging the drive gear to the guide track, the clutch mechanism includes a clutch lever operable between a first position and second position respectively corresponding to a first state in which the drive gear is engaged to the track gear and a second state in which the drive gear is disengaged from the track gear;
one or more rolling devices configured to freely move on one or more rails of the guide track;
a mounting mechanism for selectively clamping the one or more rolling devices to the one or more rails, the mounting mechanism includes a clamp lever operable between a first position and a second position respectively corresponding to a first state in which the one or more rolling devices are clamped and a second state in which the one or more rolling devices are undamped; and
a locking mechanism configured to secure the clutch lever in the first position to prevent operation to the second position,
wherein the locking mechanism comprises a locking tab extending transversely to an elongated portion of the clutch lever in the first position, the locking tab having a hole configured to receive a pin and to guide the pin over the elongated portion of the clutch lever.

2. The tractor unit of claim 1, further comprising a second locking mechanism coupled to the clamp lever, wherein the second locking mechanism secures the clamp lever, the second locking mechanism having a hole configured to receive a pin and to guide the pin over the elongated portion of the clamp lever.

3. The tractor unit of claim 2, further comprising an aperture in a housing of the tractor unit configured to receive the pin guided over the elongated portion of the at least one of the clutch lever or the clamp lever.

4. The tractor unit of claim 2, wherein the pin is a quick release pin.

5. The tractor unit of claim 2, further comprising:
a lanyard tab secured to a bolt of a housing of the tractor unit; and
a lanyard having a first end coupled to the lanyard tab and a second end coupled to the pin.

6. The tractor unit of claim 2, wherein the pin is one of a ball-lock pin, a clevis pin, or a cotter pin.

7. The tractor unit of claim 1, wherein the locking mechanism comprises a flexible locking clip configured to deflect to allow a lever being closed to slide past and to spring back to a locking position to secure the lever in a closed position.

8. The tractor unit of claim 1, wherein the at least one of the clutch lever or the clamp lever includes a hole configured to receive a pin, the pin is configured to prevent movement of the at least one of the clutch lever or the clamp lever when installed.

9. The tractor unit of claim 8, an aperture in a housing of the tractor unit configured to receive the pin installed through the at least one of the clutch lever or the clamp lever.

10. The tractor unit of claim 9, wherein the pin is installed in the at least one of the clutch lever or the clamp lever in a direction tangential to an arc swept by the at least one of the clutch lever or the clamp lever during operation.

11. The tractor unit of claim 1, wherein the clutch lever is configured to selectively retract the drive gear from the track gear.

12. A tractor unit for a welding system, comprising:
a drive gear configured to engage a track gear on a guide track;
a clutch mechanism for selectively engaging the drive gear to the guide track;
a mounting mechanism for selectively clamping the tractor unit to one or more rails of the guide track; and
a cam handle coupled to the clutch mechanism and operable between a first position and a second position, the first position being a closed position which engages the drive gear to the track gear, the second position being an open position which disengages the drive gear, the cam handle comprising:
a cam portion configured to rotate about an axis;
a lever extending radially from the cam portion; and
a leg portion extending transverse to the lever and configured to stop a rotation of the cam handle during transition to the first position.

13. The tractor unit of claim 12, wherein the leg portion is positioned such that the lever extends beyond to form an overhanging portion that operates as a grip portion to facilitate quick release of the cam handle.

14. The tractor unit of claim 12, wherein the cam handle is coupled to the mounting mechanism and the leg portion operates as stop during closure of the cam handle such that the tractor unit becomes clamped to the one or more rails at a stop position of the cam handle.

15. The tractor unit of claim 12, the cam handle further comprising an aperture on a bottom surface of the leg portion configured to receive a threaded foot.

16. The tractor unit of claim 15, wherein the threaded foot is height-adjustable in a direction of the leg portion to configure a stop position of the cam handle.

17. The tractor unit of claim 12, wherein the leg portion is a threaded pin extending from the lever, the threaded pin is height-adjustable to configure a stop position of the cam handle.

18. The tractor unit of claim 12, further comprising a stop screw extending from a housing of the tractor unit and configure to engage the leg portion when the cam handle is in the first position.

19. The tractor unit of claim 18, wherein the stop screw is threaded to provide height adjustment.

20. The tractor unit of claim 12, further comprising a lock mechanism configured to secure the cam handle in the first position, wherein the lock mechanism comprises a quick release pin that when installed is configured as a restraint across a top portion of the lever.

* * * * *